UNITED STATES PATENT OFFICE.

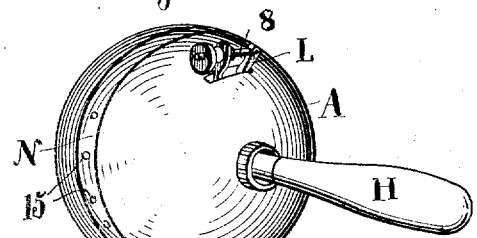
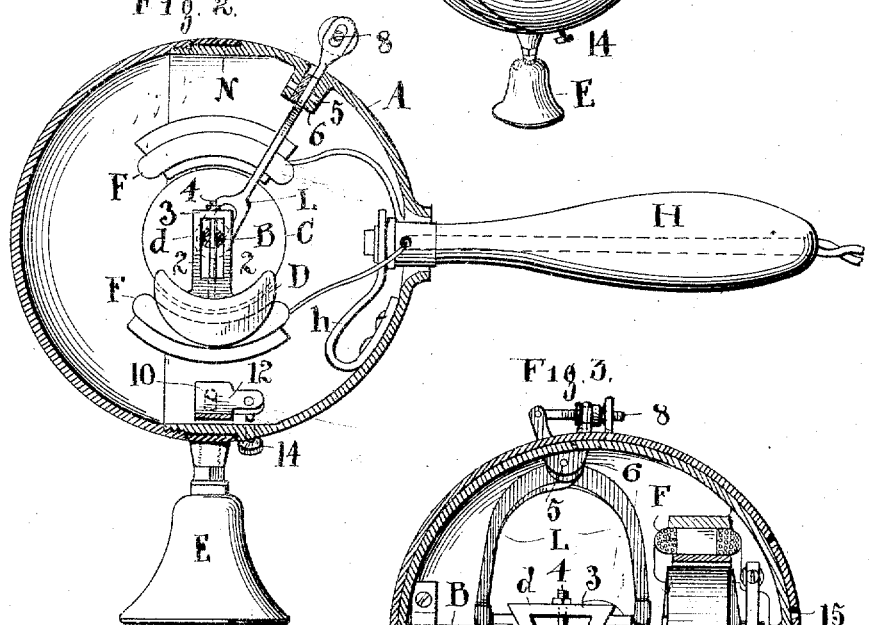
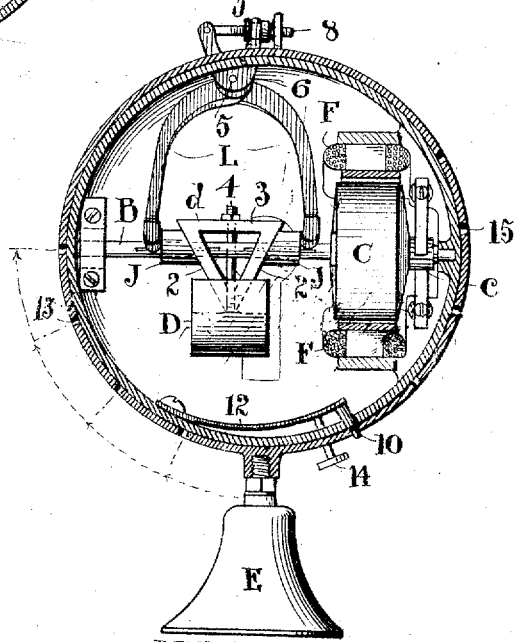

WILLIS I. MILLER, OF CLEVELAND, OHIO.

ELECTRICALLY-OPERATED VIBRATOR.

No. 868,795.  Specification of Letters Patent.  Patented Oct. 22, 1907.

Application filed March 7, 1907. Serial No. 361,178.

*To all whom it may concern:*

Be it known that I, WILLIS I. MILLER, a citizen of the United States, residing at Cleveland, in the county of Cuyahoga and State of Ohio, have invented certain new and useful Improvements in Electrically-Operated Vibrators; and I do declare that the following is a full, clear, and exact description of the invention, which will enable others skilled in the art to which it appertains to make and use the same.

My invention relates to an electrically operated vibrator, and the invention consists in the construction and arrangement of parts, substantially as shown and described and particularly pointed out in the claims.

In the accompanying drawings, Figure 1 is a perspective view of my new and improved vibrator. Fig. 2 is a vertical cross section thereof at right angles to its motor axis, and Fig. 3 is a cross section at right angles to Fig. 2, both of these views being correspondingly enlarged as compared with Fig. 1.

The invention as thus shown is embodied in a spherical casing or shell A, a rotatable shaft B therein, a motor C on said shaft, a weight D mounted on said shaft to rotate therewith, an applicator E upon the outside of said casing and rotarily adjustable thereon and other details as will now appear. Thus, the casing A is preferably constituted of two parts hemispherically united on the plane of the motor axis and separably secured together. The shaft B is supported at its end in bearings within the casing and motor C is fixed thereon and provided with fields F, commutator c and suitable operating and electrical connections preferably through handle H. Said handle is supported through a hole in the casing by a spring h inside and of sufficient strength but also with sufficient resiliency to practically absorb the vibrations so far as the hand is concerned. Said handle is at right angles to the motor axis or shaft.

The weight D is preferably of substantially crescent shape, or approximately in side elevation and is hung on shaft B so as to slide to and from the same within limits according as greater or less vibratory action, or emphasis of action, is wanted, and to this end I provide the said weight with a double sided triangular shaped support d having straight edges 2 converging toward the weight and cross portion 3 connecting the deflected ends of said side edges and engaged centrally with the weight by means of a screw 4. Shaft B passes between the opposite sides 2 of said support d, and screw 4 is projected through shaft B and slidable therein, and serves to operatively engage the weight with the shaft.

Sleeves J are splined or otherwise slidably mounted on shaft B and have inner beveled faces of the same angle as inclined edges 2 against which they bear, and said sleeves are engaged at their outer portions about shaft B by clamping arms L. Said arms are pivotally united and adapted to operate after the manner of pincers or tongs by a joint pivot 5 on lugs or ears 6 on the inside of the casing and with their outer ends extending and spread outside the casing and connected by a screw 8. This enables me to press the sliding sleeves J inward more or less and thereby crowd the counterweight correspondingly inward toward shaft B and thus lessen its throw and the vibratory action.

Applicator E is mounted on a band N rotarily adjustable about casing A and is locked in adjustment by pin or bolt 10 from the inside of the casing and supported by spring 12 and controlled by finger grip 14. Said bolt takes into holes 15 in the band, and it will be seen that said band holds the shell or sphere upon the axis of shaft B, so that as the applicator is shifted around more or less toward said shaft the vibratory action thereof is modified, and there is considerably less of the pounding effect than when as shown.

What I claim is:

1. In electrically actuated vibrators, a spherical casing, a shaft mounted centrally in said casing, an electric motor upon said shaft within the casing and a weight eccentrically mounted on said shaft between the ends thereof in said casing and a handle mounted on said casing.

2. A vibrator having a spherical casing and a handle thereon, a shaft and a motor mounted on the shaft in said casing, and a weight mounted eccentrically upon said shaft and adjustable toward and from the shaft.

3. In a vibrator a vibrator comprising a spherical casing formed in two parts, a shaft and a motor thereon mounted in said casing, an eccentrically mounted counterweight on said shaft and adapted to rotate therewith, and means for adjusting said counterweight to and from said shaft comprising a substantially triangular support for the weight on the shaft.

4. In a vibrator a spherical casing and the motor and shaft therein, in combination with a weight eccentrically mounted upon said shaft and having a triangular frame slidingly engaged with said shaft, and means to move said weight to increase or decrease the throw thereof.

5. In a vibrator the spherical casing and the motor and shaft therein, the weight having a double sided triangular support astride said shaft and a central member engaging said support and passing through said shaft into said weight, whereby the weight is rotatably engaged with the shaft.

6. In a vibrator the combination of the shell and the shaft and the motor thereon, with the weight eccentrically mounted on said shaft, said mounting comprising a triangular double sided support for the weight, a central member passing from said weight through the shaft, and beveled sleeves engaging the side edges of the support.

7. In a vibrator the spherical casing and the shaft and the motor therein, in combination with an eccentrically mounted weight and a triangular support for the weight embracing both sides of the shaft, a central member engaging the weight with the shaft, beveled sleeves on the shaft engaging the sides of said support, and pivotally connected arms adapted to press against the upper portion of said sleeves and govern the position of the weight in respect to the shaft.

8. In a vibrator the spherical casing and the mechanism therein to cause vibrations, in combination with a band centrally about said casing and adjustable thereon, and an applicator secured to said band.

9. In a vibrator the combination of the spherical casing and mechanism therein to cause vibrations, an adjustable band holding said casing centrally in the axis of said shaft, and an applicator fixed to said band.

10. In a vibrator a spherical casing and means therein to cause vibrations, a band about said casing adjustable rotarily thereon, an applicator secured to said band and means to lock said band in adjustment, whereby the applicator may be brought nearer to or farther from the immediate axis of said shaft.

11. In a vibrator a spherical casing and means therein to cause vibrations, a band about said casing and an applicator thereon, said band adjustable rotarily, and means to engage and lock said band consisting of a bolt and a spring inside of the casing to press the bolt into locking position on the band, and means to release said bolt engaged with said spring from without the casing.

In testimony whereof I sign this specification in the presence of two witnesses.

WILLIS I. MILLER.

Witnesses:
R. B. MOSER,
F. C. MUSSUN.